H. L. PITMAN.
COMBINED TYPE WRITING AND COMPUTING MACHINE.
APPLICATION FILED FEB. 3, 1915.

1,280,292.

Patented Oct. 1, 1918.
5 SHEETS—SHEET 1.

Witnesses:-
W. O. Westphal
Julius Duchstine

Inventor:
Henry L. Pitman
by D. L. Stickney
Attorney

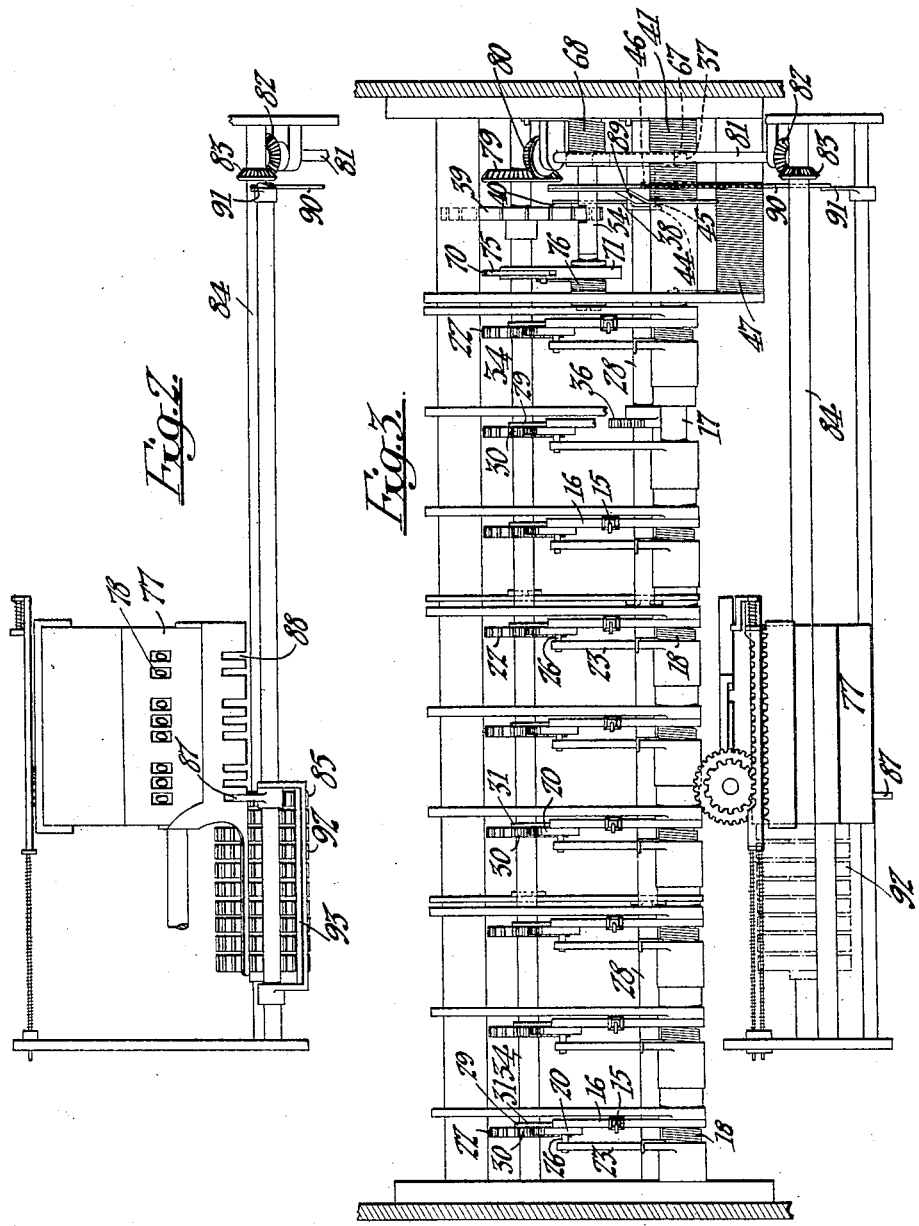

H. L. PITMAN.
COMBINED TYPE WRITING AND COMPUTING MACHINE.
APPLICATION FILED FEB. 3, 1915.
1,280,292.
Patented Oct. 1, 1918.
5 SHEETS—SHEET 3.
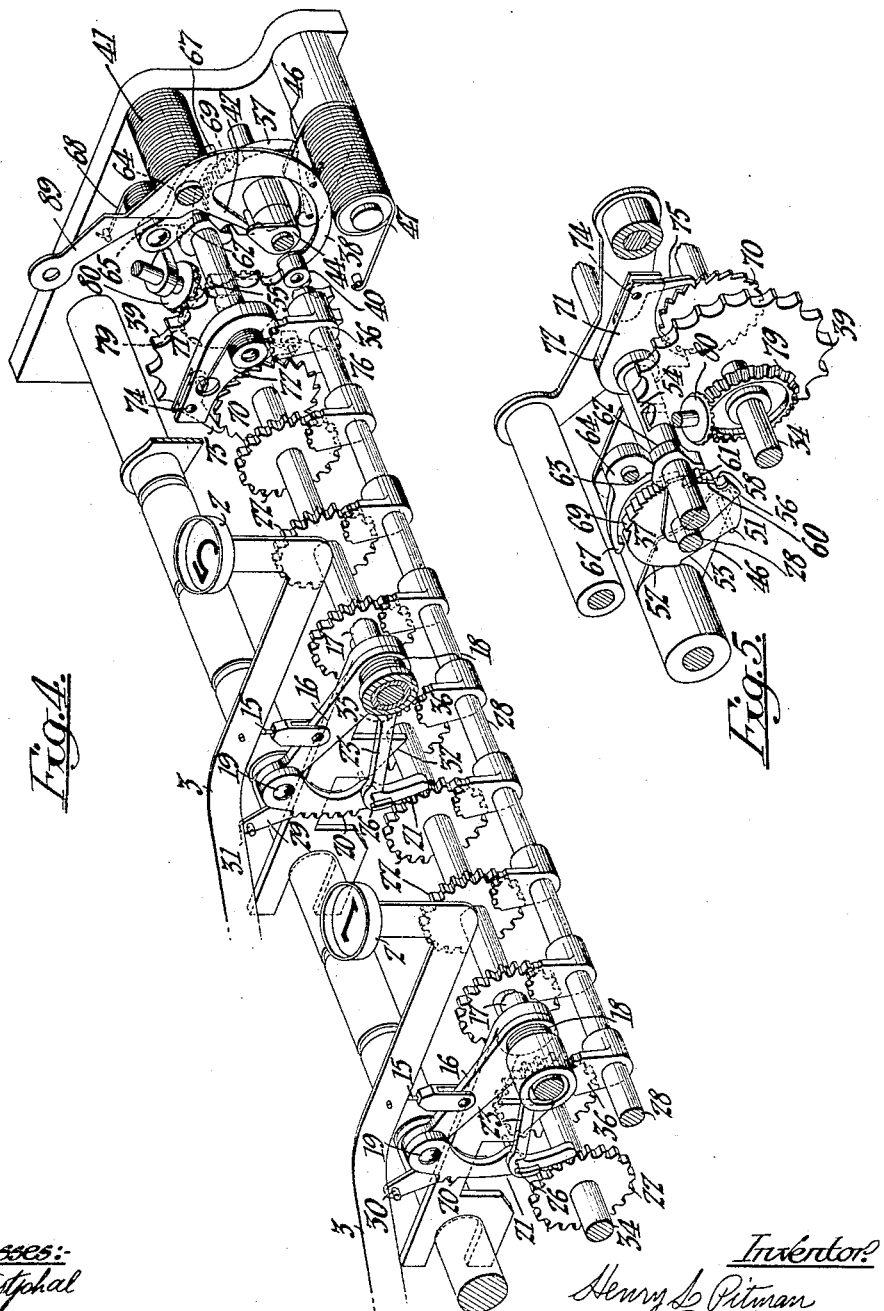

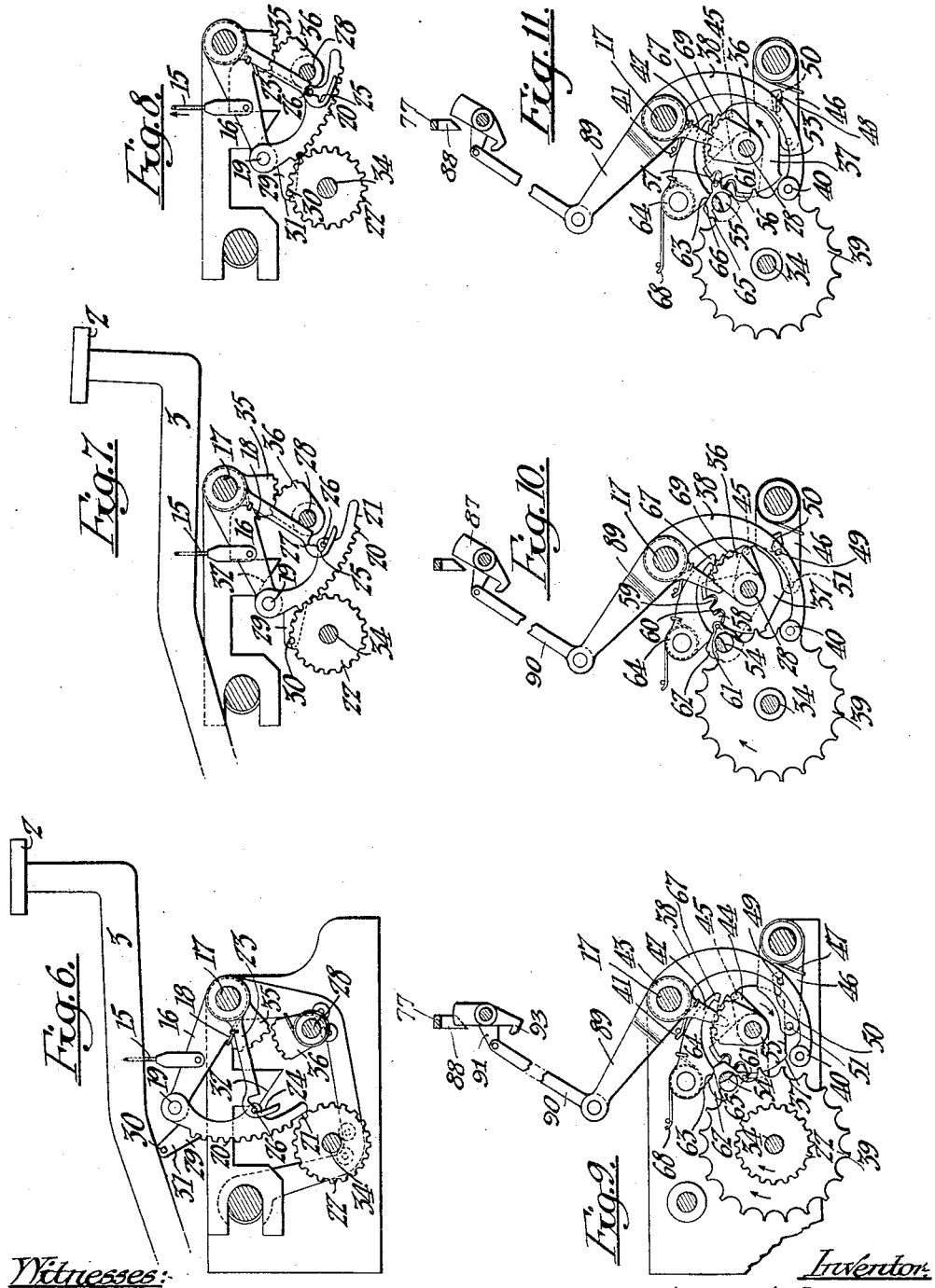

H. L. PITMAN.
COMBINED TYPE WRITING AND COMPUTING MACHINE.
APPLICATION FILED FEB. 3, 1915.
1,280,292.
Patented Oct. 1, 1918.
5 SHEETS—SHEET 5.
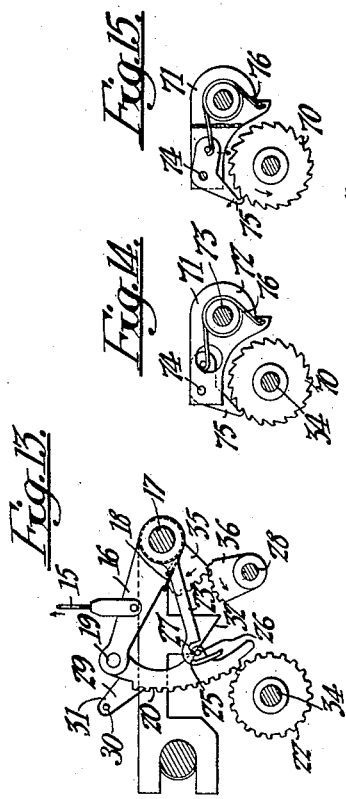
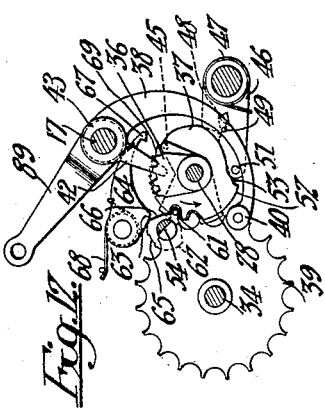
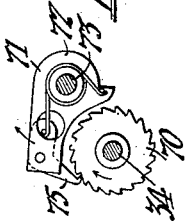
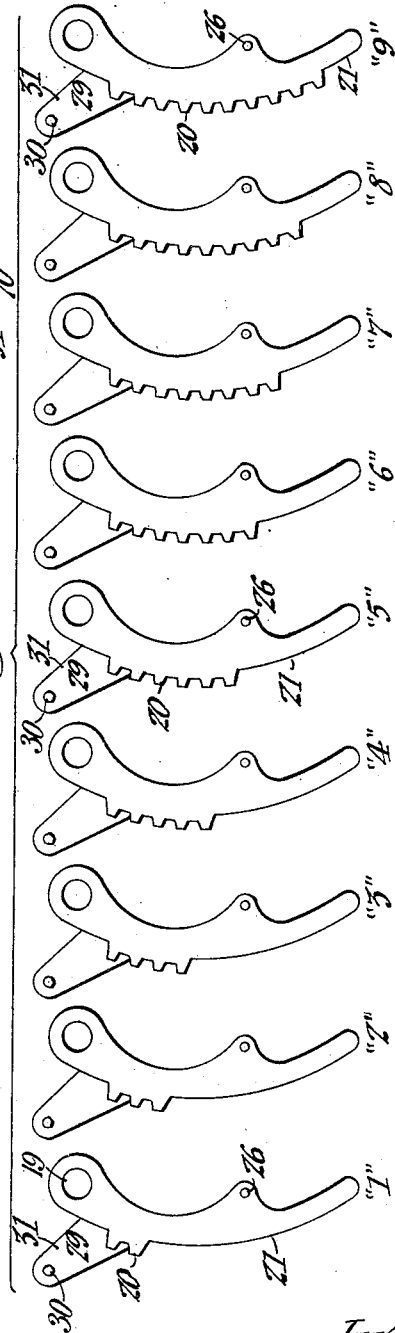
Witnesses:
Inventor:
Henry L. Pitman
by B. L. Stickney
Attorney.

UNITED STATES PATENT OFFICE.

HENRY L. PITMAN, OF EAST ORANGE, NEW JERSEY, ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,280,292.       Specification of Letters Patent.        Patented Oct. 1, 1918.

Application filed February 3, 1915. Serial No. 5,822.

*To all whom it may concern:*

Be it known that I, HENRY L. PITMAN, a citizen of the United States, residing in East Orange, in the county of Essex and State of New Jersey, have invented certain new and useful Improvements in Combined Type-Writing and Computing Machines, of which the following is a specification.

This invention relates to a combined type-writing and computing machine, and may be considered an improvement on my Patent No. 1,045,434, granted to me November 26, 1912.

In the embodiment in which the invention is shown, the computing mechanism is key-driven. That is to say, the numeral keys actuate the computing mechanism varying amounts according to the values of the numeral keys. To do this, the numeral keys drive valuating or indexing mechanism including racks of variable extent or number of teeth, to correspond with the values of the associated numeral keys. The racks drive associated gears on a common shaft, which is connected to drive the master wheel or wheels for the computing heads or totalizers.

A feature of the invention is the automatic disengagement of the valuating or indexing driving racks by a movement in the plane of their driving motion, so that while they are active during one stroke of the associated numeral keys, they will be automatically disconnected or silenced for the other stroke of their associated numeral keys. This is accomplished by having each rack pivoted at one end to move in a fixed circle or arc, while the other end is held rigid to move in a similar arc for one stroke, but automatically released at the end of such stroke, so as to permit the teeth of the rack itself to cam the rack away from engagement with the associated gear. The non-pivoted end of the rack reassumes automatically a rigid position to move in its outer circle so as to engage its associated gear at the next active stroke.

Another feature of the invention is the location of the driving indexing or valuating units for the several numeral keys of the typewriter beneath the same so as to be out of the way, while a driving connection controlled from these valuating or indexing units extends from one end thereof up to the totalizers or computing heads, which may be located at the top and front of the typewriting machine proper, thereby giving readily accessible and visible totalizers within easy range of the operative's line of sight, while the valuating and driving mechanism therefor is located comparatively well within the confines of the typewriting machine frame.

A further feature of the invention is the locking and justifying of the various active parts of the computing mechanism in a new and simple manner so that all overthrow or other improper action of the various parts is prevented. This includes an overthrow lock for each numeral-key-driven unit; an overthrow lock for the drive as a whole; a justifying detent or lock for the drive as a whole, and a computing wheel and non-traveling lock for the totalizer.

Other features and advantages will hereinafter appear.

In the accompanying drawings,

Fig. 2 is a detail front view in elevation of one of the totalizers or computing heads.

Fig. 3 is a horizontal section showing the drive from the valuating or indexing mechanism to one of the totalizers or computing heads.

Fig. 4 is a skeleton perspective view showing the driving valuating or indexing mechanism in its normal condition.

Fig. 5 is a skeleton perspective view of part of the mechanism shown in Fig. 4, taken from the opposite side.

Fig. 6 is a detail view in vertical section taken from front to rear, and showing the "9" key with the mechanism actuated thereby, all in normal position.

Fig. 7 is a view similar to Fig. 6, except that the "9" key has been depressed to the limit of its down stroke.

Fig. 8 is a further view of the parts shown in Figs. 6 and 7 after the valuating or indexing driving rack has become disengaged from its associated gear.

Fig. 9 is a detail section taken from front to rear of the overthrow locking and justifying means for the driving or valuating mechanism as a whole, and showing the justifying detent as removed and locked in its disengaged position during the down stroke of a numeral key but before such down stroke has been completed.

Fig. 10 is a view of certain of the parts shown in Fig. 9, except that the numeral key has just completed its down stroke which corresponds with Fig. 7, and has permitted the reëngagement of the justifying detent with the locking wheel, while the locking detent for this wheel has come into play to positively prevent any further movement.

Fig. 11 is a further view of the parts shown in Figs. 9 and 10 as the numeral key starts to rise, showing that the means for releasing the locking detent has a limited relative movement before coming into play.

Fig. 12 is a view of the parts shown in Figs. 9 to 11 after the numeral key has almost returned to its normal raised position.

Fig. 13 is a view of some of the parts shown in Figs. 6 to 8, showing the same in the position they will occupy when the numeral key has almost returned to its normal raised position in which the driving rack or valuating member is almost returned to its rigid position with the latch about to engage the same.

Figs. 14, 15 and 16 are detail views of the one-way detent mechanism for preventing a backward rotation of the main drive shaft, which, however, will yield in an abnormal strain to permit a backward rotation of the main drive shaft; such yielding is shown in Fig. 15, while the normal rotation is shown in Fig. 16.

Fig. 17 is a collective view of the valuating or indexing driving racks or segments for the various numeral keys.

Figure 1:
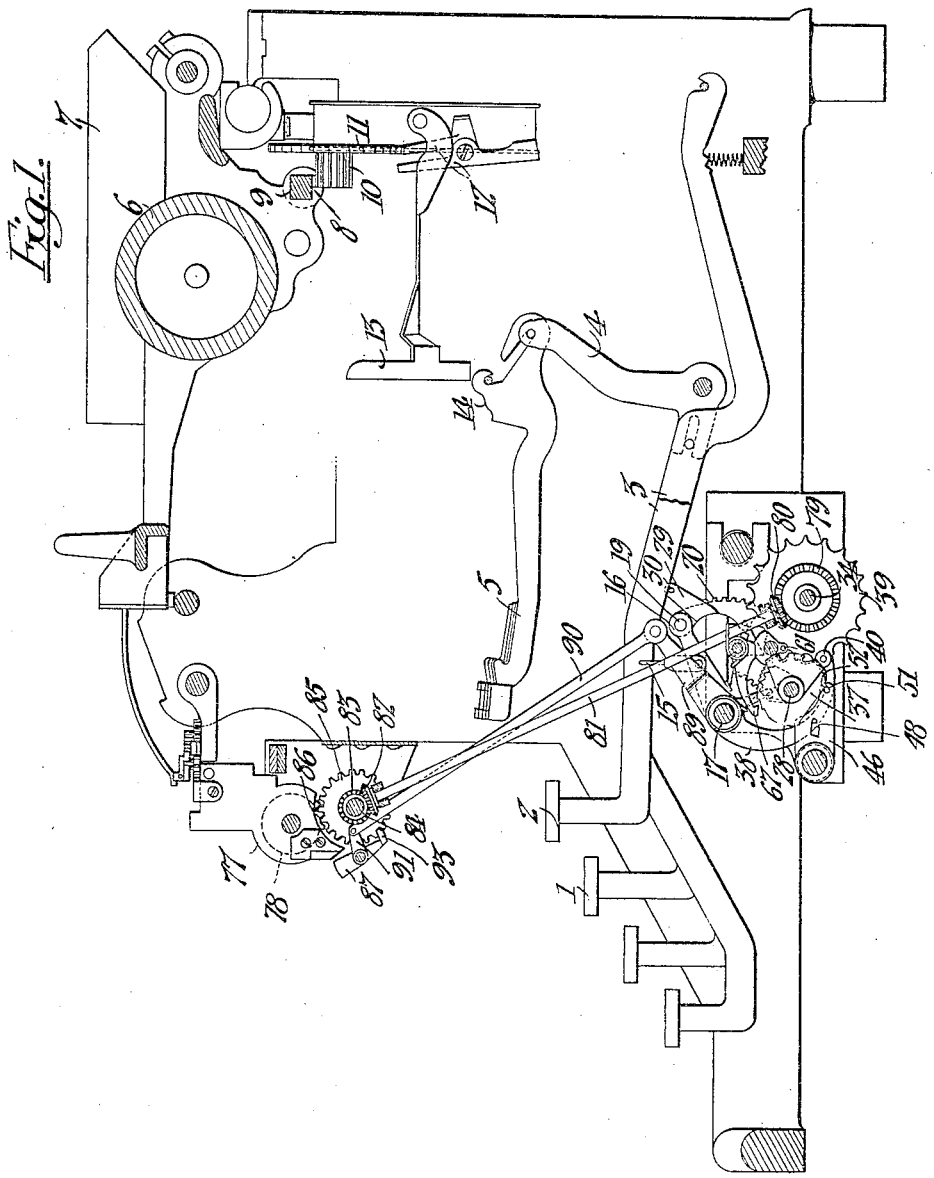
Figure 1 is a vertical skeleton section taken from front to rear.

The invention is shown as applied to the well-known Underwood typewriting machine, in which alphabet keys 1 and numeral keys 2 depress key-levers 3 to rock bell cranks 4, to swing type-bars 5 up rearwardly against the front side of a platen 6 mounted to rotate on a carriage 7. The carriage 7 has a step-by-step traveling movement at the actuation of any of the keys, under the control of an escapement mechanism 8. This escapement mechanism includes a rack 9 pivotally mounted on the carriage 7, engaging with a pinion 10 controlled by an escapement wheel 11, which in turn is controlled by fixed and movable dogs 12. The dogs 12 are given an oscillation at the actuation of any of the keys, by means of a universal frame 13, which is engaged by heels 14 provided on the type-bars 5.

To control and in fact actuate the computing mechanism, the numeral keys 2 are each provided with a thrust link 15 arranged to oscillate an arm 16 loosely mounted on a common shaft 17. The arm 16 in each case is pivotally connected at 19 to a driving rack bar 20, which is also a valuating or indexing member. That is to say, there are nine of these rack bars 20, one for each of the keys from "1" to "9", and they vary in their magnitude according to the values of the associated numeral keys. That is to say, the number of teeth for the "1" numeral key is smallest, and the number of teeth for the "9" key is largest, the intervening teeth varying by a fixed increment according to the values of the associated numeral keys, as shown in Fig. 17. In the present embodiment, the successive increment of teeth is one; that is, the "1" rack has two teeth; the "2" rack, three teeth; the "3" rack, four teeth, and so on, up to ten teeth for the "9" rack, the extra tooth being merely to provide an extra purchase or driving engagement.

The driving rack bar 20 is in each case arcuate, so as to form, in effect, the segment of a gear rotating about the shaft 17 as a pivot. Normally, however, a smooth portion 21 of each rack bar is opposite the associated one of a series of gears 22, so that each rack bar has a certain idle movement before the teeth thereof come into driving engagement with the gear 22, the extent of idle movement being greatest for the "1" key, and smallest for the "9" key.

In order to hold the other end from the pivotal end of each rack bar, rigid during the down stroke of the associated numeral key, there is provided therefor a strut arm 23, which is pivoted on the shaft 17 and provided with a hook or latch 24, having a depression 25 to engage a pin 26 provided on the associated rack bar 20, and hold the same in its outermost or active position. There is also provided in the hook or latch 25, a lesser depression 27 to engage and yieldingly hold pin 26 and thus the rack 20, in its inner or inactive position.

Considering this action specifically, as a numeral key is depressed it carries with it its rack bar 20, until the teeth thereof come into mesh and driving engagement with the associated gear 22, so as to rotate the same. Toward the end of the down stroke of the numeral key, the strut arm 23 comes into engagement with a shaft 28, permitting the rack 20 to move on while the latch 24 disengages the notch 25 from the pin 26. At the end of the down stroke of the numeral key, an overthrow lock 29, shown in the form of a beveled pin 30 on an arm 31, carried by the rack bar 20, comes into mesh with the teeth on the gear 22, so as to prevent overthrow of the same, and also so as to limit the downward movement of the numeral key and the associated parts.

On the up stroke of the numeral key the gear 22 is locked as will be explained while the rack bar 20 has been released so that it is forced to swing about its pivot 19 out of mesh with the gear 22, in which position it is caught and held by the notch 27 engaging the pin 26 until the numeral key approaches the end of its upward stroke. As the numeral key approaches its normal upper position, the pin 26 engages a fixed incline or cam surface 32, and is forced back into its normal position in engagement with the notch 25, in which position the rack bar 20 once more on a subsequent down stroke of the same numeral key, will move in a path such that it will engage the teeth on the gear 22. The spring 18 is tensioned between the arms 16 and 23, so that it acts to hold the latch 24 in either of its locking positions. It will be noted that by this arrangement the rack bar 20 is rigidly held during its active down stroke, and disengages to an inactive position at its upper stroke by a movement in the plane of its driving movement.

There is one of the gears 22 for each of the numeral keys from "1" to "9" and the associated rack bars 20, and they are all fixedly mounted on a common drive shaft 34. In addition to driving this shaft 34, the numeral keys during their actuation, perform other functions, which include justifying the position of the drive shaft 34, and locking it as a whole in addition to the overthrow locks 29.

For this purpose, there is provided on each of the arms 16, a fixed segment or rack 35, which, during the down stroke of the numeral key, comes into engagement with and drives a similar meshing segment 36 secured to the shaft 28. There is a pair of these segments for each of the numeral keys from "1" to "9." The segments 36 are all secured to the shaft 28, so as to rotate the same. The segments 35, however, are normally up out of reach of the segments 36 and only mesh therewith when moved down individually by the action of the associated numeral key so as not to clash with the associated segments 36. This shaft 28 is provided at one end with a lock controller 37.

One of the locks which this controller 37 governs the action of, is a justifying lock 38 (Figs. 9 to 12), which engages a comparatively large justifying wheel 39 secured to the common drive shaft 34. The wheel 39 is provided with comparatively large semicircular sockets between the teeth thereof, into which a roller 40 on the lock 38 engages. The wheel 39, however, may cam the roller 40 out from between the teeth when the shaft 34 is positively rotated at the same time that the shaft 28 is positively rotated, both by the depression of one of the numeral keys 2. The lock 38 is urged to its work by a spring 41, which engages an arm 42 secured to the lock 38, and which also is coiled about the shaft 17 upon which the lock 38 is pivotally mounted. The arm 42 performs another function, which consists in positively holding the lock 38 in engagement with the wheel 39 when no numeral key is depressed, and when the shafts 28 and 34 are passive. For this purpose, the shaft 28 is provided with an arm 44 having a pin 45, which when all the numeral keys 2 are in their normal raised position, will be in engagement with the arm 42, and prevent an accidental disengagement of the locking roller 40 from the locking wheel 39.

When the common drive shaft 34 is driven by one of the racks 20 at the depression of a numeral key, the lock 38 is cammed out from the position shown in Fig. 1 to the position shown in Fig. 9, where it is caught and held during the remainder of the rotation of the shaft 34 and the wheel 39, by a latch 46, which is urged toward its locking position by a spring 47. The latch 46 is provided with a shoulder 48, which engages a pin 49 on the lock 38. Normally, the pin 49 lies in an offset slot 50, and the latch 46 is incapable of acting because a pin 51 thereon engages, near the outer periphery, as at 52 (Fig. 1), the controller 37. The controller 37, as explained above, swings through an arc at the same time that the shaft 34 rotates, and brings a cutaway portion 53 of the controller into register with the pin 51, permitting the spring 47 to act so as to bring the shoulder 48 into engagement with the pin 49. At the end of the down stroke of the key as the shaft 34 comes to rest, the controller 37 is rotated beyond its mid-position shown in Fig. 9 to the position shown in Fig. 10, where the surface of the cutaway portion 53 acts as a cam on the pin 51 and releases the latch 46 so as to permit the lock 38 to come once more into engagement with the wheel 39, locking the same in its new position.

It will be remembered that during the return stroke of a numeral key, the teeth of the just active gear 22 cammed the just active rack 20 to its silent position. There is then a certain amount of tendency to rotate the shaft 34 and the locking wheel 39 backward. While the lock 38 is in engagement with the locking wheel 39 at this time, the pin 45 is not in engagement with the arm 42, so that the lock is by no means positive, especially as the shaft 28 is rotated backward at this time to bring the controller 37 and other parts connected to the shaft 28 back to their normal position. It is hence necessary to positively lock the shaft 34 and the wheel 39 at this time.

To do this, there is provided a positive half-moon lock 54 (Figs. 9 to 12), which is in the form of a cylindrical piece cut away at 55 to form a clearance way through which the teeth of the locking wheel 39 may swing during the normal rotation thereof on the down stroke of any numeral key. At the end of the down stroke of a numeral key, however, when the shaft 34 and the wheel 39 have completed their rotation, the half-moon portion of the cylindrical piece is rotated from the position shown in Fig. 9 to the position shown in Fig. 10, where it engages one of the teeth of the locking wheel 39 and prevents a further rotation thereof, the wheel rotating normally in the direction of the arrow in this figure.

The manipulation of the half-moon lock 54 is taken care of by the controller 37. To do this, the controller is provided with, a lost motion gear, which includes two outer major teeth 56 and 57, each flanked on one side by sockets 58 and 59, with a minor tooth 60 between these latter sockets. The lost motion gear is arranged to alternately engage first by means of the tooth 56 and then by means of the tooth 57, a pin 61, so as to alternately rock in opposite directions, a shifter 62 rigid with the half-moon lock 54.

In Fig. 9, the half-moon lock and the shifter 62 are shown in their normal position. The controller 37, however, is moved about one-half of its first stroke, and the tooth 56 is about to engage the pin 61 to rock the same into the tooth-socket 58 so that the shifter 62 is swung from the position in Fig. 9 to the position in Fig. 10, whereby the half-moon lock 54 is rotated from its idle position in Fig. 9 to its locking position in Fig. 10, which takes place at the end of the down stroke of a numeral key and at the end of the first stroke of swing of the controller 37. In order to prevent an accidental swing of the shifter 62, it is locked by a detent 63 on an arm 64, which engages a socket 65 in the normal unlocked position of the half-moon lock 54, and which also engages a flat surface 66 in the locking position of the half-moon lock 54, as seen at Fig. 10.

During the return stroke of the numeral key and of the controller 37, the pin 61 does not sink into the socket 58 as it did on its initial movement, but escapes over the tooth 60 and is engaged by the tooth 57 which forces it into the socket 59. This gives a limited return movement of the controller 37 and of the actuated numeral key before the wheel 39 and the shaft 34 are unlocked. This is sufficient time to permit the rack 20 to be cammed to its inactive position and held there by the notch 27 of the latch 24.

The detent arm 64 performs an additional function to that of holding the shifter 62 and its lock 54 in the unlocked and locked positions of the latter, which function is the prevention of overthrow of the controller 37 and the shaft 28 which carries the same. For this purpose the arm 64 is formed with a dog 67, which as the detent surface 63 comes off the cylindrical periphery of the shifter 62 on to the flat surface 66, will permit the dog 67 to be urged by a spring 68 into engagement with one-way-acting ratchet teeth 69 provided on the surface of the controller 37. The dog 67 is shown in its effective position at the end of the down stroke of a numeral key, in Fig. 10. This dog and ratchet also acts as a full-stroke mechanism on return stroke of numeral key. When the projecting tooth 57 unlocks the half-moon lock 54, it also causes the shifter 62 to act as a cam to throw the dog 67 out of engagement with the ratchet 69, as shown in Fig. 12.

In order to prevent an accidental backward rotation of the drive shaft 34, it is provided with a one-way ratchet wheel 70 (Figs. 5, 14, 15 and 16), the teeth of which face all in the same direction. A composite dog 71 engages the teeth of this ratchet wheel and will normally prevent accidental backward rotation of the shaft 34, but will permit a forced backward rotation. The dog 71 is formed of a body portion 72 which pivots about a shaft 73, shown in the present instance to form an extension of the half-moon lock 54. Pivoted at 74 in the body portion 72, there is provided a hook pawl 75, which is yieldingly held in engagement with the ratchet wheel 70 by means of a spring 76. Ordinarily the weight of the dog as a whole holds the pawl 75 in engagement with the ratchet wheel 70, and the normal rotation of the ratchet wheel with the shaft 34, as shown in Fig. 16, will merely lift the dog 71 against the weight of the parts. The hook 75 and the spring 76 are positive enough to prevent a weak attempt at backward rotation of the ratchet wheel 70, such as might occur under the drag of the numeral key type action during its normal return. If, however, it should be necessary to force the shaft 34 and the ratchet wheel 70 backwardly, as in case one or more numeral keys were concomitantly actuated and had to be returned to their normal position, the teeth of the ratchet wheel 70 would cam the pawl 75 outwardly against the tension of the spring 76, permitting such contra-rotation.

It has thus far been shown how the uniform movement of the numeral keys 2 is translated into a differential movement of the common drive shaft 34 according to the values of the individual numeral keys actuated. The purpose of so rotating the shaft 34 is to obtain differential drives whereby the numbers corresponding to the numeral keys actuated may be run up into a totalizer or computing head 77 (Figs. 1, 2 and 3), so that the dial wheels 78 thereof will exhibit the aggregate sum of the values of the numeral keys actuated. In order to transmit this motion from the shaft 34, it is provided with a bevel gear 79 which meshes with a bevel gear 80 on a forwardly-extending shaft 81 provided at its opposite end with a bevel gear 82 driving a bevel gear 83 on a master-wheel shaft 84, which shaft may be provided among others with a master wheel 85 arranged to drive *seriatim* a series of computing wheels 86 connected to rotate the dial wheels 78. This mechanism may be of any desired character, for example, that illustrated in my Patent No. 1,045,434, granted November 26, 1912. The main idea, however, is to provide for a relative step-by-step movement between the master wheel 85 and the computing wheels 86, so that the former can drive the latter *seriatim*. In the present instance the totalizer 77 is shown to be connected so as to have a concomitant movement with the carriage 7.

In order that the totalizer 77 and thus the computing wheels 86, may stop accurately at letter spaces or denominational intervals, there is provided a dog 87, which is arranged to engage in slots 88 provided in the casing of the computing head or totalizer 77. The accurate position of the dog 87 in one of these slots 88 corresponds to the accurate register of the master wheel 85 with one of the computing wheels 86. Inasmuch as this registration is to be accurately determined at least when the master wheel 85 starts into rotation, the movement of the locking dog 87 is controlled from the drive shaft 34, and in the present instance by means of the justifying lock 38. It will be remembered that the justifying lock 38 is cammed out at the first part of the movement of the shaft 34, hence just so soon as this rotation is taking place, then the lock 87 will be forced into one of the slots 88. To provide for the connection, the lock 38 is provided with an arm 89, which is connected by a link 90 to an arm 91 rigid with the lock 87. If the totalizer 77 should be largely out of its true position, or if it should be at a comma or other punctuation space, then the lock 87 would be prevented from going into one of the slots 88, by means of the metal between the same. Hence the lock 38 would be prevented from moving out of engagement with the wheel 39, so that the shaft 34 could not rotate, and therefore the numeral keys 2 could not be depressed. This would warn the operative that there was an incorrect action of some kind taking place.

The lock 87 when not locking the totalizer 77, engages the master wheel 85 and a series of carry-over or transfer wheels 92, so as to prevent accidental rotation thereof. This is done by providing the lock 87 with a bail 93 engaging the master wheel 85 and the transfer or carry-over wheels 92.

Considering the operation of the machine, the carriage 7 is brought to the computing zone and to the particular initial digit column or letter-space in which it is desired to write and compute the first digit. This automatically, through the connection, brings the totalizer so that the computing wheel corresponding to the digit column or denominational order to be printed in, will be in register with the master wheel 85. The numeral key having the digital value to be computed will then be struck, whereby the type-bar 5 associated therewith will rise to strike the work-sheet on the platen 6 to print this digit. Concomitant with the printing action, the numeral key depresses the associated driving unit which includes one of the rack bars 20 having a number of teeth proportionate to the value of the actuated numeral key. As the rack 20 descends it will have a certain amount of idle movement dependent on the value of the key and the amount of blank space before the first tooth of the rack comes into play. During such down stroke the rack 20 is held in its outermost position where the driving unit is rigid, so that the teeth of the rack 20 will come into engagement with the associated gear 22 and drive the same. At the very first movement of the shaft 34 under this driving action, the teeth of the justifying wheel 39 will force the justifying lock 38 out of mesh therewith, so that the totalizer lock 87 will, if the totalizer is in proper position, come into one of the slots 88, thus unlocking the transfer or carry-over wheels 92 and the master wheel 85, permitting rotation thereof. Rotation of the shaft 34 is transmitted through the train of gearing to the master-wheel shaft and to the master wheel, so that inasmuch as the shaft 34 is rotated an amount corresponding to the value of the key actuated, the master wheel will be rotated a corresponding amount, which in turn will be transferred to the computing wheel in register with the master wheel. Hence the number will be shown up in the dial wheel or added to the number previously exhibited in such dial wheel.

To go back to where the initial movement of the shaft 34 released it from the justifying lock 38, it will be found that the depressed key also has rotated, through the segment gears 35 and 36, the shaft 28, which swings the controller 37. The controller 37 will move from the position shown in Fig. 1 to the position shown in Fig. 9, during the first portion of the down stroke of the numeral key, permitting the latch 46 to come into play and hold the justifying lock 40 in its silent position so that it will not click over the teeth of the justifying wheel 39. At the end of the down stroke, however, the controller 37 has passed the Fig. 10 position, releasing the latch 46 and permitting the justifying lock 38 to come into engagement, and at the same time forcing the half-moon lock 54 into engagement, both with the justifying wheel 39, and accurately determine the stopping position of the shaft 34, although this is determined, to a certain extent, by the over-throw lock 30 on the active rack 20 as it comes to the end of its movement. At this time the downwardly-moving arm 23 is arrested by engagement with the shaft 28, and the pin 26 is disengaged from the latch 24. The articulated elements of the driving member or unit as a whole are thus rendered free for relative movement, so that on the return stroke the teeth of the gear 22 may cam the rack 20 to its outermost position shown in Fig. 8, where it is caught by the second notch 27 in the latch 24 and held free and clear of the teeth of the gear 22.

Contra-rotation of the gear 22 and the shaft 34 is prevented by the dog 71 and also by the half-moon lock 54, which latter came into play at the end of the down stroke of the numeral key by virtue of the tooth 56 having driven the pin 61 into the tooth-socket 58. This action also forced the over-throw dog 67 into engagement with the ratchet teeth 69, limiting the initial swing of the shaft 28 and the controller 37. As the actuated numeral key returns, the pin 26 on the rack 20 comes into engagement with the cam surface 32, first releasing the rack from the latch 24, and then forcing it into its outermost position where it is caught by the notch 25 of the latch 24, and held so that on a subsequent down stroke it will drive the associated gear 22. The return of the numeral key also causes a contra-rotation of the shaft 28, which returns the controller 37 to its normal position, causing the Geneva tooth 57 to actuate the shifter 62, thereby releasing the half-moon lock 54, and releasing the overthrow dog 67. If the key should not be fully returned, the overthrow dog 67 would remain in play and act as a full-stroke mechanism, preventing subsequent action of a numeral key until the previously actuated numeral key had been fully returned.

Complete return of the numeral key brings the pin 45 into engagement with the arm 42, and maintains the justifying lock 38 in engagement with the justifying wheel 39 to prevent any rotation of the shaft 34 until a numeral key 2 is actuated. The next numeral key 2 corresponding to the next digit to be written and computed can be actuated completing another cycle of operation, which action may be repeated until all the digits of a number to be computed are written and run up into the totalizer.

Variations may be resorted to within the scope of the invention, and portions of the improvements may be used without others.

Having thus described my invention, I claim:

1. The combination with a series of gears rotating about one fixed axis, of a series of arcuate racks forming true gear sectors swinging to drive said gears about another fixed axis, and numeral keys of different values associated with said racks for determination of rotations of said gears by said racks according in amount to the values of said numeral keys, the driving action between said gears and said racks being destroyed and silenced by a collapsing action at a point between said fixed axes of rotation.

2. The combination with an articulated collapsible driving unit, of a numeral key controlling the action of said driving unit, a driven unit actuated by said driving member when the latter is rigid, and automatic tripping means acting at the termination of a driving stroke to break the resistance of said driving unit and thereby destroy the driving effectiveness thereof.

3. The combination with a rack and supporting means for holding said rack rigid moving as a unit to form a driving member, of a gear driven by said driving member, a numeral key for controlling the driving action of said member, and a trip lying in the path of movement of said supporting means to disengage the same from said rack to enable said gear to force said rack out of mesh therewith by a return movement of said driving member.

4. The combination with a gear, of an arm pivoted for a rotary swinging movement, a rack pivoted to said arm to swing with said arm in the plane of said gear, and a second arm for alternately engaging said rack to hold it in mesh with said gear and disengaging said rack to permit a yielding receding motion of said rack with respect to said gear in the plane thereof, whereby said rack will alternately drive and pass ineffectively by said gear.

5. The combination with a gear, of an arm pivoted for oscillatory movement, a rack pivoted to said arm to swing with said arm in a plane of said gear, a second arm for alternately holding said rack in mesh with said gear and permitting a yielding receding motion of said rack in the plane of said gear with respect to said gear, whereby said rack will alternately drive and pass ineffectively by said gear, tripping means for said second arm acting at the end of one stroke of said first arm, and rehabilitating means for said second arm acting to reestablish the engaging position of said rack with respect to said gear at the other end of the stroke of said first-mentioned arm.

6. The combination with a gear, of a rack for driving said gear, an arm pivotally supporting said rack at one end, an arm yieldingly supporting said rack at the other end, a numeral key for controlling the movement of said arms and said rack, tripping means for disengaging said second arm with respect to said rack at one end of one stroke of said rack so as to permit a disengagement of said rack from said gear, and a cam for reengaging said second arm with said rack in a position such that said rack will reëngage said gear.

7. The combination with a gear, of a rack for driving said gear, an arm pivotally supporting said rack at one end, an arm yieldingly supporting said rack at the other end, a numeral key for controlling the movement of said arms and said rack, tripping means for disengaging said second arm with respect to said rack at one end of one stroke of said rack so as to permit a disengagement of said rack from said gear, a cam for reëngaging said second arm with said rack in a position such that said rack will reëngage said gear, and a spring tensioned between said arms to lock said second arm and said rack in the two positions of relative adjustment.

8. The combination with a gear, of a rack having an oscillatory movement to drive said gear on one stroke thereof, a numeral key for controlling the movement of said rack, said gear acting to cam said rack out of engagement therewith during the inactive stroke thereof, and locking means for maintaining said gear rigid during such camming action.

9. The combination with a gear, of a rack for driving said gear, an arm pivotally supporting said rack, means for actuating said arm, a second arm for supporting said rack, and a pin on said rack, said second arm having a plurality of notches to engage said pin and hold said rack in a plurality of positions, one in which said rack drives said gear and one in which said rack is incapable of driving said gear.

10. The combination with a numeral key, of a link connected to be actuated by said numeral key, an arm connected to be actuated by said link, a pivot shaft for said arm, a rack pivoted to said arm, a second arm pivoted to said shaft and engaging said rack to hold the same in a plurality of positions, all in the same plane, and a gear engaged by said rack to be driven thereby in certain positions thereof, said arms swinging about a common center during active and inactive movements of said rack, and said rack swinging in different paths in the same plane for active and inactive movements thereof.

11. The combination with a series of numeral keys varying in values, of a series of driving members, including mutilated racks, associated with said numeral keys to be actuated thereby, and varying in range according to the values of their corresponding keys, gears to be driven by said racks, a common driven shaft for said gears, and automatically-acting means effective at the end of the down and up strokes respectively to make said driving members alternately non-rigid and rigid so as to render the same alternately ineffective and effective.

12. The combination with a computing drive shaft, of numeral keys for controlling the movement of said drive shaft in one direction, and a one-way-acting dog-and-ratchet mechanism for preventing a rotation of said drive shaft in the opposite direction but forcible in emergency to yield for a backward rotation of said drive shaft.

13. The combination with a computing drive shaft, of numeral keys for controlling the rotation of said drive shaft in forward direction, a ratchet wheel on said drive shaft, and a dog for engaging said ratchet wheel for normally preventing a backward rotation of said drive shaft, said dog comprising a pawl, a body portion holding said pawl in engagement with said ratchet wheel by the weight thereof, and a spring permitting an abnormal yielding of said pawl relative to said body portion on an excessive pressure tending to rotate said drive shaft backwardly.

14. The combination with a computing shaft, of numeral keys for controlling the rotation of said computing shaft forwardly, a one-way-acting ratchet wheel on said shaft having the teeth thereof facing in one direction, and a dog engaging said ratchet wheel to normally prevent backward rotation thereof, said dog comprising a hooked pawl engaging the teeth of said ratchet wheel on the abrupt sides thereof to prevent backward rotation of said shaft, a loosely-pivoted body portion for supporting said pawl, holding said pawl in yielding engagement with said ratchet wheel, said pawl being pivoted on said body portion, and a spring normally holding said pawl in locking engagement with said ratchet wheel as against backward rotation, but yielding on an excessive backward strain to permit an abnormal backward movement of said shaft.

15. The combination with a computing shaft, of a justifying wheel secured to said shaft having teeth spaced apart by semicircular sockets of considerably greater peripheral magnitude than said teeth, a justifying lock for entering the space between said teeth on said wheel to accurately determine the stopping position of said shaft, means normally tending to urge said lock into engagement with said wheel, said wheel acting when said shaft rotates, to cam said lock out of engagement therewith, and a latch for catching said lock in its disengaged position with respect to said wheel.

16. The combination with a computing shaft, of a justifying wheel secured to said shaft, having teeth spaced apart by semicircular sockets of considerably greater peripheral magnitude than said teeth, a justifying lock for entering the spaces between said teeth on said wheel to accurately determine the stopping position of said shaft, means normally tending to urge said lock into engagement with said wheel, said wheel acting when said shaft rotates, to cam said lock out of engagement therewith, a latch for catching said lock in its disengaged position with respect to said wheel, and a controller active when said shaft is active to determine the action of said latch on said lock.

17. The combination with a computing shaft, of a justifying wheel for said shaft, a justifying lock for said wheel, spring means normally tending to urge said lock into its locking position, said wheel acting when said shaft rotates, to cam said lock out of engagement therewith, a pin on said lock, a latch having a socket in which said pin normally engages, and a shoulder for catching said pin and said lock in a position corresponding to the disengagement of said lock from said wheel when said shaft is rotating.

18. The combination with a computing shaft, of a justifying wheel for said shaft, a justifying lock for said wheel, spring means normally tending to urge said lock into its locking position, said wheel acting when said shaft rotates, to cam said lock out of engagement therewith, a pin on said lock, a latch having a socket in which said pin normally engages, a shoulder for catching said pin and said lock in a position corresponding to the disengagement of said lock from said wheel when said shaft is rotating, and means for releasing said latch at the completion of the rotation of said shaft, so that said lock may come into engagement with said wheel to accurately determine the stopping position of said shaft.

19. The combination with a computing shaft, of numeral keys for controlling the rotation of said shaft, a justifying wheel on said shaft, a justifying lock for said wheel, a latch for holding said lock in its disengaged position with respect to said wheel, and a controller effective at the completion of the down stroke of an active numeral key to release said latch to permit the engaging of said lock and said wheel.

20. The combination with a computing shaft, of a justifying wheel for said shaft, numeral keys for controlling the rotation of said shaft, a justifying lock for said wheel, positive means for holding said lock disengaged from said wheel during the rotation of said shaft, and positive means for holding said lock in engagement with said wheel when said keys and said shaft are silent.

21. The combination with a computing shaft, of numeral keys for rotating said shaft, a justifying wheel for said shaft, a justifying lock for said wheel, a latch for holding said lock in a position disengaged from said wheel, an arm on said lock, and a second arm engaging said first-mentioned arm to hold said lock in engagement with said wheel when said keys and said shaft are passive.

22. The combination with a computing shaft, of a justifying wheel for said shaft, a justifying lock for said wheel, a latch for holding said lock in disengaged position with respect to said wheel, an arm on said lock, a second arm engaging said first-mentioned arm to maintain said lock in engagement with said wheel against accidental displacement with respect thereto, and numeral keys controlling the rotation of said shaft and the action of said lock under the control of said latch and said arms.

23. The combination with a computing shaft, of a wheel on said shaft, a lock for said wheel, a latch for said lock, a controller normally preventing the action of said latch, means distinct from said latch for maintaining said lock in a given position with respect to said wheel, and numeral keys controlling the action of said last-mentioned means and said controller and the rotation of said computing shaft in proper sequence, to rotate said shaft a given amount corresponding to the value of the numeral key actuated and stop it at the instant of completion of such rotation.

24. The combination with a computing shaft, of numeral keys for controlling the rotation of said shaft, a wheel on said shaft, a lock for said wheel releasable during a portion of the key stroke of an actuated numeral key, and a second lock engaging said wheel to supplement the action of said first-mentioned lock on said wheel, both of said locks being ineffective on said wheel during a period of rotation of said shaft actually caused by one of said numeral keys.

25. The combination with a computing shaft, of numeral keys for rotating said shaft, a wheel on said shaft, and a positive lock and an impositive lock both coming into play at the termination of a rotation of said shaft by one of said numeral keys to accurately determine the stopping point of said shaft.

26. The combination with a computing shaft, of numeral keys for controlling the rotation of said shaft, a wheel on said shaft, having teeth spaced apart by semicircular sockets of considerably greater peripheral magnitude than said teeth, and a half-moon lock for said wheel having a clearway through which said teeth may cut during a rotation of said shaft and a solid portion brought by a rotation of said lock into a space between two of said teeth to positively prevent a rotation of said wheel and said shaft.

27. The combination with a computing shaft, of numeral keys for controlling the rotation of said shaft, a wheel on said shaft having teeth spaced apart by semicircular sockets of considerably greater peripheral magnitude than said teeth, a half-moon lock for said wheel having a clearway through which said teeth may cut during a rotation of said shaft and a solid portion brought by a rotation of said lock into a space between two of said teeth to positively prevent a rotation of said wheel and said shaft, and controlling means brought into play at the end of a stroke of one of said active numeral keys to rotate said half-moon lock.

28. The combination with a computing shaft, of a plurality of driving sets for rotating said computing shaft, a plurality of numeral keys, one for each of said driving sets, an overthrow lock associated with each of said driving sets for preventing excessive rotation of said shaft, and an overthrow lock common to all of said numeral keys for preventing excessive rotation of said shaft.

29. The combination with a computing shaft, of a plurality of driving sets for said computing shaft, a numeral key for each of said driving sets, an individual overthrow lock associated with each of said driving sets to prevent an excessive rotation of said shaft, a justifying lock for said shaft, a positive lock for said shaft, a controller for said last two mentioned locks, and connections enabling said numeral keys to control said last-mentioned locks as well as said first-mentioned individual locks.

30. The combination with a computing shaft, of numeral keys for controlling the rotation of said shaft, justifying and overthrow locking means for said shaft, controlling means dominated by said numeral keys for determining the effectiveness of said last-mentioned means, and an overthrow-preventing lock for said controlling means.

31. The combination with a computing shaft, of numeral keys for controlling the rotation of said shaft, justifying and overthrow locking means for said shaft, controlling means dominated by said numeral keys for determining the effectiveness of said last-mentioned means, and a full-stroke mechanism for said numeral keys acting on said controlling means.

32. The combination with a computing shaft, of locking means for said computing shaft, a control shaft, numeral keys for dominating the action of both of said shafts, and locking means for said control shaft, said locking means coöperating to maintain each other in predetermined positions.

33. The combination with a computing shaft, of a lock for said computing shaft, a shifter for said lock, a lost motion gear for operating said shifter, and numeral keys for controlling the rotation of said shaft and the action of said lost motion gear.

34. The combination with a computing shaft, of a wheel on said shaft, a lock for said wheel, a shifter for said lock, an oscillating lost motion member for actuating said shifter momentarily at opposite ends of its stroke, and numeral keys for controlling the rotation of said computing shaft and the oscillations of said lost motion member.

35. The combination with a shaft, of a disk on said shaft, ratchet teeth on said disk, a dog to engage said ratchet teeth, and lost motion gearing controlled from said disk for operating said dog.

36. The combination with a computing shaft, of a master wheel driven from said computing shaft, numeral keys for controlling the extent of movement of said computing shaft, a series of computing wheels to be driven seriatim by said master wheel, said master wheel and said computing wheels having a relative step-by-step movement, a lock for preventing the relative step-by-step movement between said computing wheel and said master wheel while said master wheel is rotating, a latch for maintaining said lock in action, and means for releasing said latch at the end of a rotation of said master wheel.

37. The combination with a computing shaft, of a lock for said computing shaft, a control shaft for said lock, a series of driving units for said control shaft, driving connections from each of said driving units to said control shaft, and a series of numeral keys for driving said driving units, one for each of said driving units.

38. The combination with a computing shaft, of a series of gears on said shaft, a series of racks for driving said gears, a series of arms connected individually to said racks, locking and justifying means for said computing shaft, a control shaft for said locking and justifying means, a series of segments on said control shaft, a series of segments connected to said arms to be operated thereby to drive said first-mentioned segments, and a series of numeral keys for operating said arms.

39. The combination with a computing shaft, of a series of gears on said shaft, a series of valuating racks meshing to drive said gears, latching means for maintaining each rack in driving engagement with its associated gear, locking means for preventing the rotation of said computing shaft, and concomitantly acting means for bringing said locking means for said shaft into play as said latching means is released to permit a disengagement of the active rack with respect to the associated gear.

40. In a computing machine, the combination with a gear, of an arcuate rack for driving said gear, two pivots about which said rack may swing, one coinciding with the center of the pitch circle of said rack when driving, and the other adjacent the pitch circle of said rack, and releasable means for intermittently maintaining said rack in coincidence with the pitch circle having said first-mentioned pivot as a center.

HENRY L. PITMAN.

Witnesses:
W. O. WESTPHAL,
DELOS G. HAYNES.

Copies of this patent may be obtained for five cents each, by addressing the "Commissioner of Patents, Washington, D. C."